Sept. 28, 1926.  
LE ROY LACKEY  
SCALE  
Filed Nov. 30, 1925
BEST AVAILABLE COPY
1,601,026
2 Sheets-Sheet 1
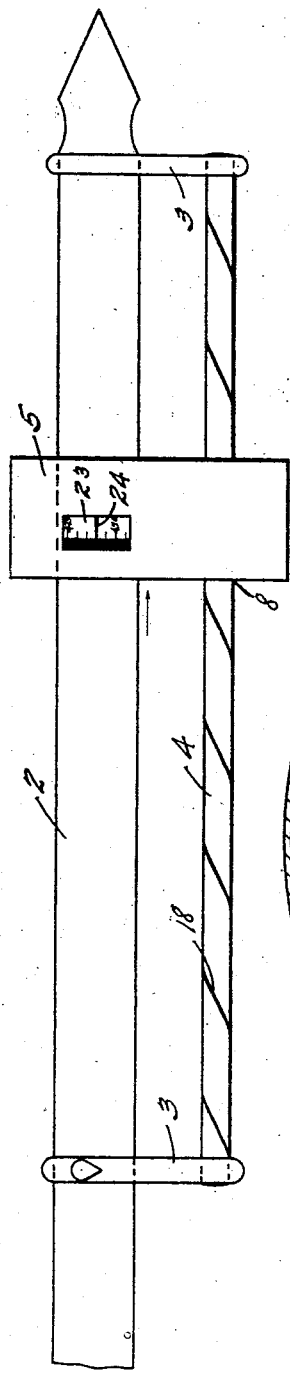
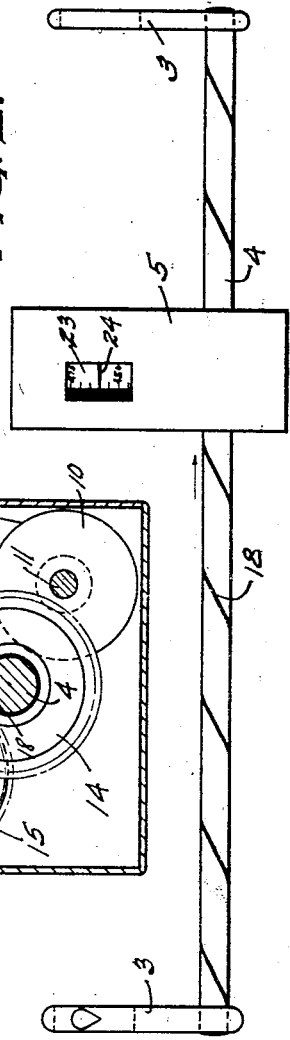
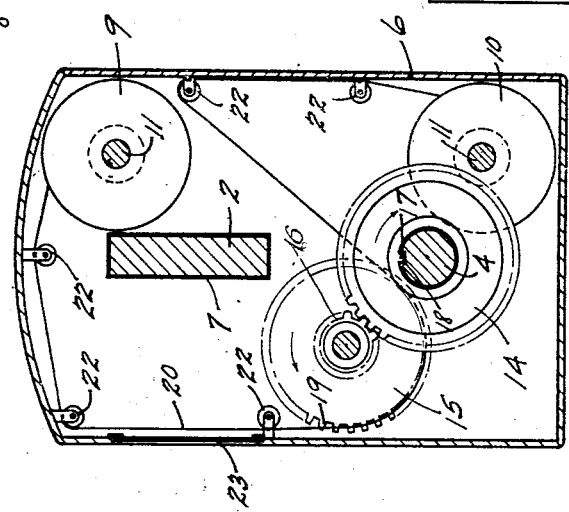
Inventor  
Le Roy Lackey  
By Adam E. Fisher.  
Attorney Sept. 28, 1926.
BEST AVAILABLE COPY
LE ROY LACKEY
SCALE
Filed Nov. 30, 1925
1,601,026
2 Sheets-Sheet 2
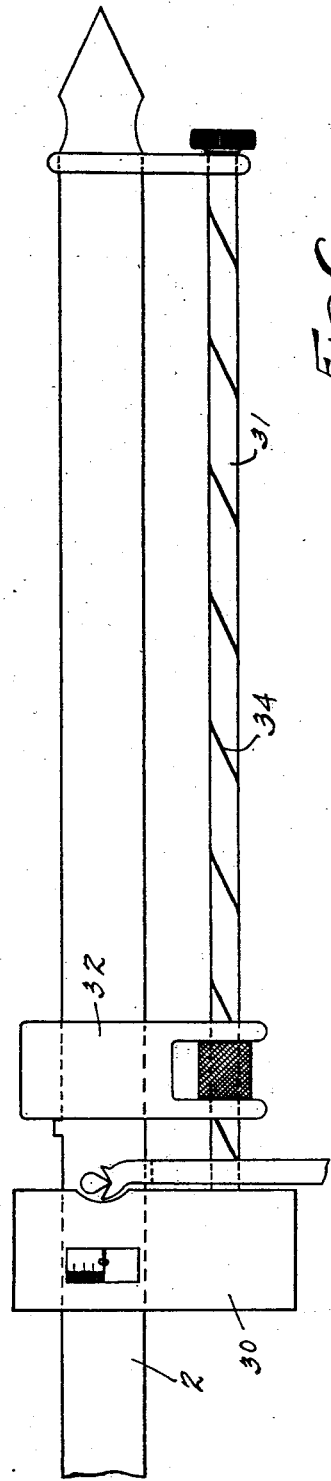
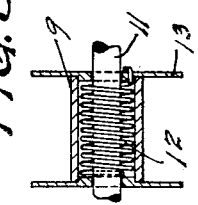
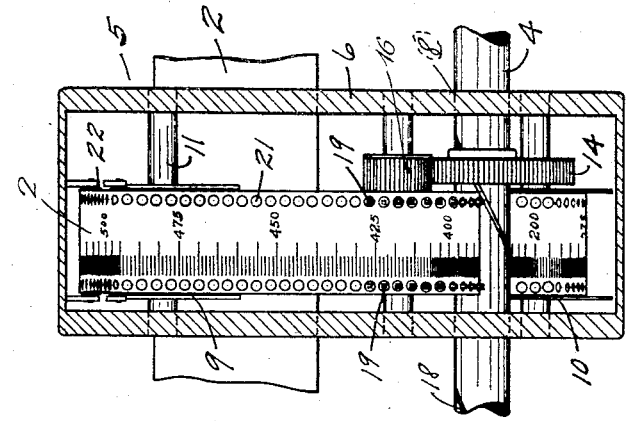
Inventor
Le Roy Lackey
By Adam E. Fisher
Attorney Patented Sept. 28, 1926.

1,601,026

UNITED STATES PATENT OFFICE.

LE ROY LACKEY, OF DETROIT, MICHIGAN, ASSIGNOR OF ONE-HALF TO ARNOLD WOOD AND J. M. GASTON, OF DETROIT, MICHIGAN.

SCALE.

Application filed November 30, 1925. Serial No. 72,225.

This invention is an improvement in weighing scales of the pivotal beam type, and the primary object of the invention is to provide in a relatively simple and practical form an attachment for scales of this kind, whereby such scale is converted into what may be termed a semi-automatic scale. Stated more fully, the chief object is to provide for a scale of the type described, the beam whereof has been removed; a special beam the same having an attached worm shaft extended parallel therewith and a combined poise and weight registering element slidingly mounted on the said beam and shaft, the said poise having an automatic weight registering mechanism incorporated therein which is adapted to be actuated by the said worm shaft as the poise is moved along the shaft in the act of balancing the load on the scales.

Another object is to provide a weight registering element for fixed location at the butt of the said scale beam and worm shaft with a poise slidably mounted upon the oscillating end of the beam and shaft, the said poise having a lug engaging the said worm shaft for rotating the same and actuating the said weight registering element as the poise is moved along the shaft.

In the drawing—

Figure 1 is a side elevation of a beam scale equipped with this improvement, the weight registering element being here represented as slidable;

Figure 2 is a side view of the attachments removed from the scale;

Figure 3 is a transverse vertical section through the poise, beam and worm shaft. This view is enlarged relative to Figure 1.

Figure 4 is a longitudinal vertical section through the assembly shown in Figure 3;

Figure 5 is a detail of one of the tape reels, a portion of one side being broken out to show the arrangement of the coil spring mounted within;

Figure 6 is a side elevation of a modified arrangement of the attachments, wherein the weight registering element is represented as fixed, the same being actuated by a sliding poise on the beam and shaft.

This invention comprises certain attachments designed to be mounted in connection with an ordinary scale of the pivotal beam type, whereby such scale is rendered semi-automatic in its action. Referring to the embodiment of the invention illustrated in Figures 1 to 4 inclusive, these attachments include a special weighing beam 2 which is mounted on the scale in lieu of the regular beam. Brackets 3 depend from the ends of the beam 2, and a worm shaft 4 is rigidly mounted between these brackets in parallelism with the beam 2. An automatic weight registering poise 5 is slidably mounted upon the said beam and shaft. The poise 5 comprises a casing 6 having beam slots 7 and shaft holes 8 formed in alignment through its sides whereby the poise is slidingly mounted in place as stated. Within the casing 6, are journaled in alignment two hollow tape reels 9 and 10, the same being journaled upon the fixed spindles 11. Long, coil springs 12 are then mounted inside the reels, the ends of the springs being secured to the spindles 11 and the rims 13 of the reels. The torsions of the springs 12 are reversed as to each other. A power gear 14 is slidingly mounted upon the shaft 4 within the casing 6, and a small follower lug 17 extends from the axial bore of the gear into the worm groove 18 of the shaft 4. A tape supporting drum 15 is journaled within the casing 6 in alignment with the reels 9 and 10, the said drum having a pinion 16 rigidly secured at one side and in mesh with the power gear 14. The periphery of the tape drum 15 is provided with two lateral rows of spur, tape-engaging teeth 19, there being a row at each side of the said periphery. A graduated and marked weight-indicating tape 20 is provided, the same being of sufficient length and flexibility to meet the purpose for which it is intended. This tape is preferably of flexible steel and along each edge thereof is pierced a line of holes 21 for engaging the teeth 19 of the drum 15. The holes 21 and teeth 19 are of course all equi-spaced to ensure the smooth operation of the mechanism. The ends of the tape 20 are secured to the rims 13 of the reels 9 and 10, and the tape is then passed over the tape drum 15 with the teeth 19 in engagement with the holes 21. The tape is additionally supported and guided in its travel by a number of rollers 22. A frontal opening or window 23 is provided at the front of the casing 6, opposite the tape, so that the tape markings may be easily read as they pass across the pointer 24. The tape 20 may be graduated and marked in any desired manner and as finely as may be necessary for the purposes of the scale. There should be such co-relation between the lengths of the tape 20, scale beam 2 and the springs 12, that the travel of the poise 5 from one end of the beam to the other will be coincident with the travel of the tape from one reel to the other, the said springs 12 having capacity to wind up the tape fully on either reel as it is released from the other reel. The graduations indicating the travel of the tape would also of course be accurately coordinated and corelated with the standard units of weight and fractions thereof. This would be accomplished, for instance, by first balancing the scale beam with the poise, and marking "Zero" on the tape opposite the pointer; an ounce weight would then be placed in the scale pan, and the beam again balanced by moving the poise as before, a corresponding mark being made upon the tape. So on for the full length of the tape would proper markings be made on the tape for fractions of ounces, pounds, etc. as might be desired.

A modified arrangement as shown in Figure 6, wherein the weight registering element 30 is permanently fixed at the butt of the beam 2, the worm shaft 31 being rotatably journaled through the brackets 3 (instead of being rigidly mounted as in the other structure), and the power gear 14 being permanently fastened at the end of the worm shaft 31. A separate poise 32 is then slidingly mounted upon the beam 2 and shaft 31, there being a follower lug extended from the poise into the worm groove 34, analogous in action to the lug 17 of the first described structure.

This scale mechanism is simple, durable, positive, accurate and practical and may be mounted upon any standard form of beam scale in manner described. This improvement renders a scale semi-automatic, and does away with the need of a large number of separate weights.

While the embodiment of the invention here shown contemplates for the sake of convenience the removal of the regular scale beam and the substitution of a special beam with the worm shaft and poise attachments, there is no reason, if preferred, why the said worm shaft and poise might not be mounted directly upon the regular scale beam.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In combination with a scale of the pivotal beam type, the regular beam thereof being removed; an attachment of the kind described, comprising a special beam mounted in the place of the regular beam, the said special beam having a worm shaft depending therethrough; and an automatic weight registering poise slidingly mounted upon the beam and shaft; and a weight registering mechanism carried by said poise, the said mechanism being connected with and operated by the said worm shaft.

2. In combination with a scale of the pivotal beam type, the regular beam thereof being removed; an automatic weight registering attachment, comprising a special beam mounted in place of the regular beam, the said special beam having a worm shaft depending therethrough; a poise slidingly mounted upon the beam and shaft; and a weight registering mechanism carried by the poise, the said mechanism including two tape reels, a graduated tape mounted to travel on the reels and means associated with the said worm shaft for causing the said tape to travel from one reel to the other as the said poise traverses the shaft.

3. In combination with a scale having a weighing beam, an automatic weight registering attachment, comprising a worm shaft depending from the said beam in parallel relation thereto; and a weight registering poise slidingly mounted on the beam and shaft; the said poise including a casing having a frontal opening for reading weights and aligned lateral openings for engaging the said beam and shaft, spring actuated tape reels in the casing, a tape graduated for weights mounted on the reels, and means operated by the said worm shaft for causing the said tape to travel from one reel to the other under the sliding movement of the poise along the shaft.

4. In combination with a pivotal beam scale, automatic weight registering attachments therefor, comprising a worm shaft rigidly supported by the beam; and a weight registering poise slidingly mounted on the beam and shaft; the said poise comprising a casing having sight, beam and shaft apertures, two spring actuated tape reels journaled in the casing with the torsions of the springs of the reels in reversed relation, a power wheel loosely mounted upon the worm shaft inside the casing, the said wheel having a follower lug slidingly engaging the worm groove of the shaft, a graduated tape mounted over the reels, and means connecting the said power wheel with the said tape for causing the latter to travel the said reels under the rotary action imparted to the power wheel by the longitudinal travel of the poise upon the shaft.

5. In combination with a pivotal beam scale, an automatic weight registering mechanism therefor, comprising a worm shaft rigidly supported by the beam in parallel relation thereto; a casing slidingly mounted on the beam and shaft, the same having a window therein; a power gear loosely mounted upon the worm shaft inside the casing, the said gear having a follower lug slidingly engaging the worm groove of the shaft; a tape supporting drum and attached pinion journaled in the casing with the said pinion in mesh with the said power gear, the said drum having lateral, spur, tape engaging teeth upon its periphery; two spring controlled tape reels journaled in the casing; and a graduated weight indicating tape mounted over the said reels and tape drum, the said tape being perforated along its edges with holes adapted to engage the teeth of the said tape drum.

6. In a pivotal beam scale, employing a combined poise and weight indicating mechanism; a driving element for the said mechanism, comprising a worm shaft supported by the scale beam and operatively connected with the mechanism.

7. In a pivotal beam scale employing a sliding poise upon the beam; an automatic weight indicating mechanism, comprising two spring actuated tape reels; a graduated tape on the reels; and means operatively connected with the sliding poise for causing the tape to travel the reels as the poise is moved.

8. In a pivotal beam scale employing a sliding poise upon the beam; an automatic weight indicating mechanism, comprising two spring actuated tape reels mounted upon and constituting part of the poise; a graduated tape on the reels; and means for causing the tape to travel the reels as the poise is moved.

9. In a pivotal beam scale employing a sliding poise upon the beam; an automatic weight indicating mechanism mounted upon the poise, comprising two spring actuated tape reels; weight indicating tape on the reels; and means for causing the tape to travel the reels as the poise is moved.

10. In a pivotal beam scale, a combined poise and weight indicating mechanism slidingly mounted upon the beam, the same comprising a support; two spring actuated tape reels on the support; a weight indicating tape on the reels; and means for causing the tape to travel the reels as the said device is moved along the beam.

In testimony whereof I affix my signature.

LE ROY LACKEY.